United States Patent [19]
Weitz et al.

[11] Patent Number: 5,792,966
[45] Date of Patent: Aug. 11, 1998

[54] THERMALLY STABLE, FLUID FLOW MEASUREMENT DEVICE

[76] Inventors: Mark A. Weitz; Kevin L. Chartier, both of P.O. Box 593, Sheridan, Wyo. 82801

[21] Appl. No.: 834,895

[22] Filed: Apr. 7, 1997

[51] Int. Cl.[6] ............................................. G01P 5/14
[52] U.S. Cl. .............................................. 73/861.61
[58] Field of Search ....................... 73/861.42, 861.58, 73/861.51, 861.61–861.64

[56] References Cited

U.S. PATENT DOCUMENTS 3,521,487  7/1970  Akeley .................................. 73/861.61
3,822,592  7/1974  Siegel et al. ......................... 73/861.61
3,894,562  7/1975  Moseley, Jr. et al. ............... 73/861.63
4,432,228  2/1984  Kushmierz et al. ................. 73/861.61

FOREIGN PATENT DOCUMENTS 406201417  7/1994  Japan .................................. 73/861.61

*Primary Examiner*—Robert Raevis

[57] ABSTRACT

A fluid flow measurement device utilizing an orifice element (18) with a low coefficient of thermal expansion, allowing for accurate measurements over a wide temperature range. The orifice element (18) is held in a flowing fluid by a housing (10) (12) (14) (16) (20) (22) (24) (26) (28) (30) (32) (34) (36) (38), assembled, which allows for the measurement of pressure upstream and downstream of the orifice element.

1 Claim, 1 Drawing Sheet

THERMALLY STABLE, FLUID FLOW MEASUREMENT DEVICE

BACKGROUND

1. Field of Invention

This invention relates to the field of air flow measurement, specifically to the determination and verification of flow rates for air pollution measurement instruments.

2. Description of Prior Art

The sample flow rate of air pollution measurement instruments must be measured periodically to verify the accuracy of the system. Two types of instruments are commonly available for verifying the sample flow rate through air pollution samplers that operate in the range of 1 to 20 liters per minute. However, neither are well suited for outdoor (field) use. A third instrument, not readily available but specified in a regulatory document, is not well suited for field use either.

The soap bubble type flow meter measures the time required for movement of a soap bubble through a known internal volume, and calculates flow rate from the result. However, several features of this device limit its application to controlled environments. The volume that the soap bubble flows through is constructed of a material that has large thermal expansion/contraction characteristics. The volume changes with temperature, thereby affecting the accuracy of the flow measurement. Also, detection of the soap bubble is accomplished with light sensors. Use of the instrument in sunshine often creates interference with the bubble detector. Further, cleaning of the device is not straight forward. Dirt accumulated through use in outdoor, field environments degraded accuracy of the measurement.

The other instrument type, a dry calibration system, utilizes the same principle as the soap bubble meter. It uses a piston instead of soap bubbles to time movement through a volume. The piston is described as frictionless, with very strict tolerances on the distance between the piston and the body. However, the piston and the body are constructed of different materials with different thermal expansion coefficients. The friction in the system is therefore temperature dependent. This instrument is well known to provide inaccurate measurements of flow rate when used in cool conditions. In colder temperatures, the piston has been known to seize inside the body, making the instrument unusable.

Another device, specified by EPA in *Quality Assurance Handbook for Air Pollution Measurement Systems, Volume II: Ambient Air Specific Methods*, Section 2.10, uses the relation of pressure drop across an orifice to flow rate. However, the material specified for the orifice is not thermally stable. The size of the orifice changes significantly over the typical ambient temperature range. Therefore, the calibration of the orifice is not constant for normal field conditions. This device is not commonly available.

The principle of measuring the flow rate of air pollution samplers with an orifice has been used for a long time. However, until recently, most air pollution samplers utilized flow rates in the 1,000 liter per minute range. Orifices used to measure flow rates in this range are large enough that thermal expansion and contraction are not a problem. When the EPA specified the low flow orifice as described above, apparently the thermal expansion properties of the material were overlooked.

All prior art requires the use of adapters to be inserted in the sample flow path. This provides opportunities for leaks that degrade the accuracy of the measurement. Nor is the prior art readily serviceable, allowing dirt to degrade the measurement.

OBJECTS AND ADVANTAGES

Accordingly, several objects and advantages of our invention are:

a) to provide a fluid flow rate measurement device accurate over the range of ambient temperatures;

b) to provide a fluid flow measurement device with a direct connection to an air pollution sampler;

c) to provide a fluid flow measurement device with an integral wind screen for the orifice element;

d) to provide a fluid flow measurement device of rugged construction; and e) to provide a fluid flow measurement device that is readily serviceable.

Other objects and advantages are to provide a fluid flow measurement device that can be calibrated to a traceable standard, in a controlled environment and subsequently be used for traceable field measurements. Further objects and advantages of our invention will become apparent from consideration of the drawings and ensuing description.

LIST OF REFERENCE NUMERALS

Figure 1:
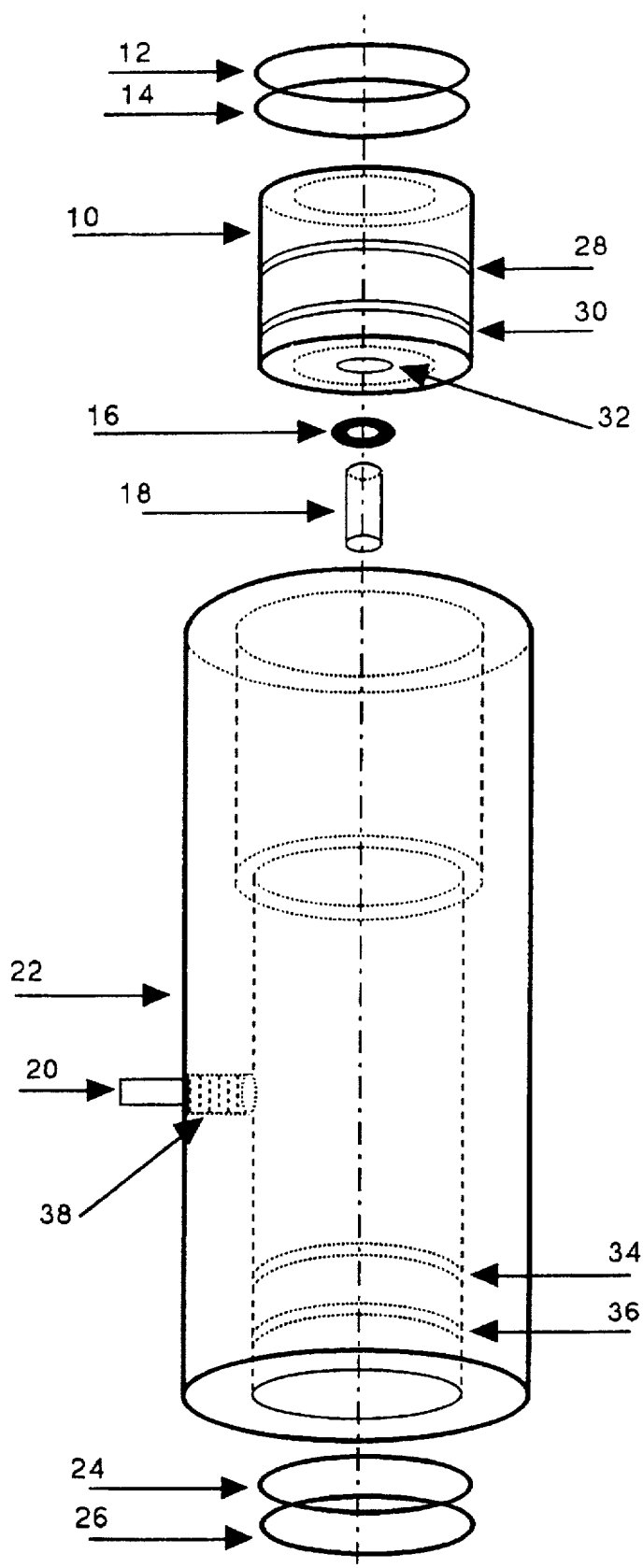
FIG. 1 shows an exploded view of our invention.

| List of Reference Numerals | |
|---|---|
| 10 Body insert | 12 Body insert upper o-ring |
| 14 Body insert lower o-ring | 16 Grommet |
| 18 Orifice element | 20 Pressure tap |
| 22 Body | 24 Body upper o-ring |
| 26 Body lower o-ring | 28 Body insert upper groove |
| 30 Body insert lower groove | 32 Body insert hole |
| 34 Body upper groove | 36 Body lower groove |
| 38 Pressure tap hole | |

SUMMARY

In accordance with the present invention a fluid flow measurement device comprises an orifice element with a low thermal expansion coefficient, mounted in a body such that the orifice is completely in the stream of the flow to be measured and a means for measuring the pressure drop across the orifice is provided.

Description

A typical embodiment of the present invention is illustrated in FIG. 1. An orifice element 18 is inserted into an elastomer grommet 16 which is inserted into a hole 32 in a body insert 10. Two elastomer o-rings 12, 14 are placed in grooves 28, 30 in the outer circumference of the body insert 10. Thus prepared, the body insert 10 is inserted into a body 22. Two elastomer o-rings 24, 26 are placed in grooves 34, 36 in the inner circumference of the body 22. A pressure tap 20 is screwed into a hole 38 drilled and tapped into the body 22.

Operation

Theory

This invention utilizes the principal of the conservation of energy for a flowing fluid, commonly known as Bernoulli's Theorem. The flow rate of a fluid, whose inherent physical properties are known, can be determined by measuring the change in pressure of the fluid as it flows through a restriction, commonly an orifice.

Application

The relationship of flow rate to change in pressure can be determined by a very complete knowledge of the geometry of the fluid path and flow restricting device, and of the fluid's inherent physical properties. However, in practice, the relationship of flow rate versus change in pressure is usually derived empirically by calibration of each individual orifice type flow measurement device against a known primary flow standard under controlled environmental conditions in a laboratory. As such, orifice type flow meters are then provided for end use with specific "calibration constants" which are then utilized in a specific derivation of Bernoulli's Equation.

When an orifice type flow device is calibrated against a primary standard, its calibration functions only for the specific fluid against which it was calibrated and for the specific geometry of the orifice at the environmental conditions at which it was calibrated. For fluids, temperature and pressure changes affect the inherent physical properties. For the restriction (orifice), temperature changes affect its geometry as it expands/contracts; this effect becomes more pronounced the smaller the orifice.

Therefore, in practice, any differences in the fluid properties, or orifice geometry, from that at which an orifice type flow device was calibrated, must be accounted for, or minimized. For gases, a knowledge of temperature and pressure are sufficient, under normal ambient conditions, to account for changes in fluid properties. It is difficult to measure and therefore account for changes in orifice geometry. This invention utilizes an orifice element made of fused silica which has extremely low thermal expansion/contraction characteristics, and thereby minimizes changes in geometry.

Thus, this device can be used to accurately measure the same fluid against which it was calibrated, at temperatures significantly different from that at which it was calibrated, by knowing the temperature and pressure of the fluid.

Operation

The orifice element 18 is held in an elastomer grommet 16 which is inserted into the body insert 10. The body insert 10 is held in the body 22, with two elastomer orings 12, 14. The body 22 has two elastomer o-rings 24, 26 inserted in grooves on the internal circumference, which allows the body 22 to be inserted on to an air pollution measuring instrument, with or without a physical adapter, depending on the air pollution measuring device. Thus assembled and installed, the orifice element is held in a place and orientation in the body which allows all measured fluid to pass through the orifice element, without fluid leakage of comprise of the orifice element's intergity and dimensions. The body 22 has a pressure tap so that the pressure of the measured fluid downstream of the orifice element 18 can be measured.

Hence installed, when the air pollution measurement instrument is operating, exactly the same air flows through both the device and instrument. The flow rate through the device can then be determined by measuring the pressure and temperature of the measured fluid, the pressure change as the fluid passes through the orifice element (18), using Bernoulli's Equation and the device's specific "calibration constants".

Summary, Ramifications, and Scope

Accordingly, the reader will see that this invention provides accurate fluid flow rate measurements over a wide range of temperatures. In addition, the device, through its design and construction, is robust and well suited for field use. Furthermore, the fluid flow measurement device has the advantages of:

a direct connection to an air pollution sampler an integral wind screen for the flow measurement orifice element, so that accurate measurements can be made in windy conditions being easily cleaned and readily serviceable Although the description above contains many specificities, these should not be construed as limiting the scope of the invention but as merely providing illustrations of some of the presently preferred embodiments of this invention. For example, the fluid flow measurement device can have other dimensions, shapes, etc., that will allow it to be used for applications other than air pollution measurement systems.

Thus the scope of the invention should be determined by the appended claims and their legal equivalents, rather than by the examples given.

We claim:

1. A fluid flow measurement device, comprised of:
    a) an orifice element constricted of fused silica
    b) a housing assembly which:
        1) holds said orifice element in a place and orientation to direct all flowing fluid to be measured through the orifice element
        2) provides a means of allowing the measurement of the change in fluid pressure across the restriction of said orifice element
    whereby the rate of said flowing fluid may be accurately determined over a wide range of conditions of fluid and environment.

* * * * *